United States Patent
Ballay (10) Patent No.: US 6,264,876 B1
(45) Date of Patent: Jul. 24, 2001

(54) IN-MOLD LABELING CYLINDRICAL BOTTLES

(76) Inventor: Thomas P. Ballay, 5300 Brockfield La., Sylvania, OH (US) 43560

(*) Notice: Subject to any disclaimer, the term of this patent is extended or adjusted under 35 U.S.C. 154(b) by 0 days.

(21) Appl. No.: 09/346,038

(22) Filed: Jul. 6, 1999

Related U.S. Application Data (60) Provisional application No. 60/092,009, filed on Jul. 8, 1998.

(51) Int. Cl.$^7$ ..................................... B29C 49/24
(52) U.S. Cl. ............... 264/509; 425/126.1; 425/503; 425/522
(58) Field of Search ............... 264/509; 425/503, 425/504, 522, 126.1

(56) References Cited

U.S. PATENT DOCUMENTS

| | | | |
|---|---|---|---|
| 4,479,770 | 10/1984 | Slat et al. | 425/503 |
| 4,479,771 | 10/1984 | Slat et al. | 425/503 |
| 4,501,548 | 2/1985 | Jahnel | 425/503 |
| 4,585,408 | 4/1986 | Darr | 425/171 |
| 4,595,449 | 6/1986 | Nowicki | 156/444 |
| 4,616,992 | 10/1986 | Oles | 425/503 |
| 4,636,166 | 1/1987 | Franks et al. | 425/503 |
| 4,639,206 | 1/1987 | Darr | 425/503 |
| 4,639,207 | 1/1987 | Slat et al. | 425/503 |
| 4,721,451 | 1/1988 | Darr | 425/503 |
| 4,737,099 | 4/1988 | Kaminski | 425/504 |
| 4,815,955 | 3/1989 | Krall | 425/116 |
| 4,834,641 | * 5/1989 | Keyser | 425/532 |
| 4,854,848 | 8/1989 | Krall et al. | 425/503 |
| 4,909,723 | * 3/1990 | Slat et al. | 264/509 |
| 4,917,592 | 4/1990 | Plenzler et al. | 425/503 |
| 4,944,665 | * 7/1990 | Hasl et al. | 425/126.1 |
| 4,954,070 | 9/1990 | Dunlap | 425/503 |
| 5,104,306 | 4/1992 | Gordon et al. | 425/503 |
| 5,198,247 | * 3/1993 | Bartimes et al. | 264/509 |
| 5,266,149 | 11/1993 | Collette et al. | 156/571 |
| 5,350,483 | 9/1994 | Yager et al. | 156/571 |
| 6,153,143 | * 11/2000 | Condon | 264/509 |

FOREIGN PATENT DOCUMENTS 0 352 385   1/1990   (EP) .

* cited by examiner

*Primary Examiner*—Robert Davis
(74) *Attorney, Agent, or Firm*—Emch, Schaffer, Schaub & Porcello Co., L.P.A.

(57) ABSTRACT

In-mold-labeling method and apparatus for labeling a plurality of cylindrical bottles simultaneously by withdrawing the end label from each of a plurality of spaced apart lanes of a label magazine, moving the transfer mechanism supporting such labels to a position aligned with the recesses of a mold and inserting a label in each of said recesses. The support mechanism with vacuum heads carrying adjacent labels causes adjacent vacuum heads to be moved to a position closer together when aligned with the mold recesses than when aligned with the respective lanes of the label magazine.

12 Claims, 6 Drawing Sheets

IN-MOLD LABELING CYLINDRICAL BOTTLES

CROSS-REFERENCE TO RELATED APPLICATION

The present application is related to Provisional Application Ser. No. 60/092,009 filed Jul. 8, 1998.

The present invention relates to a label machine and method for in-mold labeling of plastic bottles having a portion with circular cross-sectional configuration, a major portion of which defines a cylinder. In-mold labeling refers to a processes and apparatus for affixing labels to articles such as plastic bottles during the molding process by inserting labels in the recess of a mold section, closing a pair of mold sections around a length of heated, plasticized tubing and expanding such tubing into conformity with the mold cavity defined by the recesses of the closed mold sections thereby causing the label to become affixed to the wall of the newly blown bottle.

BACKGROUND OF THE INVENTION

The prior art discloses many types of methods and apparatus for accomplishing in-mold labeling of plastic bottles. For example, U.S. Pat. No. 5,350,483, which is incorporated herein by reference, discloses an in-mold labeling insertion apparatus and method according to which there is provided a carriage carrying at least one label holder. The carriage is moved in unison with the mold along a parallel path with the face of the open mold section. The carriage has a label inserting beam extending forwardly therefrom and a label holder operable to (1) receive a label from a label magazine and (2) release the label on the wall of the recess of one of the mold sections upon advancement of the carriage and insertion of the beam and label holder thereon between said open mold sections. Other methods and apparatus for in-mold labeling are shown in U.S. Pat. Nos. 4,639,206; 4,355,967; 4,479,770 and 4,479,771.

In the blow molding of plastic bottles, it is desirable to utilize blow molds having plurality of molding cavities so that a plurality of bottles are molded in each molding cycle of a set of blow molds. The blow molds utilize first and second sections which open and close. Recesses are formed in the mating faces of each of the mold sections. When the mold sections are closed, the recesses cooperate to define cavities in which the bottles are blown.

Heretofore there has not been widespread use of in-mold labeling for bottles having a cylindrical body portion, particularly in those situations where it is desired that substantially the entire circumference of the bottle be encircled by labels from the mating mold sections. In order to affix labels which substantially encircle the entire circumference of a cylindrical portion of a bottle, each mold section should have inserted in its mold recess a label having a length equal to the circumferential wall portion of such mold recess. Since two mold sections are normally utilized in blow molding a plastic bottle, the circumferential length of the cylindrical portion of a recess of each mold section will be equal to one-half of the circumference of the cylindrical portion of the bottle being formed. Accordingly, the length of a label to be inserted in each mold section recess will be equal to or substantially equal to one-half of such bottle cylindrical portion circumference.

As mentioned previously, it is frequently desirable to utilize blow molds having a plurality of molding cavities aligned with one another, with a single tubular parison being blown in each such molding cavity simultaneously with other parisons being blown in their respective cavities while the mold sections are closed therearound. Depending upon the size of the bottles being blown and the type of machine, there may be 2, 4, 6 or even 8 aligned bottles being blown simultaneously. In order to minimize the space occupied by the blow molding machine, it is desirable that each of the cavities be positioned as close to the adjacent cavities as feasible. Such close positioning of the cavities will also minimize the amount of metal required to be utilized in the molds and related equipment and minimize the amount of energy required (1) to move the mold sections between open and closed positions and, (2) depending upon the type of blow molding machine, to move the mold sections laterally or rotationally from a position beneath an extrusion die orifice for receiving a plurality of tubular parisons to a position at which air is introduced therein to expand the parisons in their respective mold cavities. However, the closeness of the positioning of adjacent mold cavities results in the distance between adjacent mold cavities being significantly less than the length of a label having a length equal to one-half the circumference of the cylindrical portion of bottle being molded. It should be noted that the labels are substantially flat or planar when they are removed from a label magazine by a label transfer mechanism which transfers the labels from the label magazine to the mold recesses. As a result of the length of such labels, when flat, being greater than the distance between adjacent mold cavities, it is necessary that the labels being carried by adjacent transfer mechanisms have overlapping edges.

SUMMARY OF THE INVENTION

Under the present invention, a placer arm assembly has a plurality of vacuum label holding heads positioned to simultaneously engaged and withdraw a plurality of labels from adjacent lanes of a label dispensing magazine and transfer such labels to and position such labels in adjacent recesses of a mold section having a plurality of recesses. The recesses in which the labels are positioned include a wall portion for receiving the label, which recess defines one-half of a cylinder and cooperates with a corresponding recess of a mating mold section to define a bottle having a cylindrical wall portion. The center-to-center spacing between adjacent recesses of the mold section is less than one-half the circumference of the cylinder. If the label to be inserted in each recess is intended to extend the full semi-circular portion of the recess, then the lengths of the labels will be greater than the center-to-center distance between adjacent mold recesses.

Under the present invention, labels are dispensed from a label dispensing magazine having a plurality of lanes for dispensing labels, with the number of lanes preferably being equal to the number of recesses and equal to the number of sets of vacuum label holding heads. The center-to-center spacing between adjacent lanes of labels is at least equal to and preferably greater than the length of the labels. Accordingly, for labels having a length equal to or substantially equal to the circumferential portion of the cylinder defined by the recess (i.e. one-half of the circumference of the cylinder), the center-to-center distance between adjacent lanes will be greater than the center-to-center distance between adjacent mold recesses. According to the present invention, adjacent sets of vacuum holding heads are spaced apart a first distance which is, preferably, substantially equal to the center-to-center distance between adjacent lanes of labels so that such sets of vacuum label holding heads may simultaneously engage and withdraw the end label from each of such lanes. A placer arm assembly supporting the sets of vacuum label holding heads then rotates to carry the label retained on each set of heads to a position at which the sets of vacuum label holding heads may insert a label into each of the recesses of the appropriate mold section. During the interval between engaging the end labels from each of the lanes and inserting them in such recesses, the adjacent sets of vacuum label holding heads and the placer arms supporting them are moved toward one another such that the center-to-center spacing between adjacent sets of vacuum label holding heads is substantially equal to the spacing between adjacent mold recesses. Such movement of adjacent sets of vacuum label holding heads toward one another is preferably done while the placer arm assembly is moving such sets of vacuum label holding heads from a position to engage the end label from each of the lanes to a position to insert the labels in the respective mold recesses. Such movement of the sets of adjacent vacuum label holding heads toward one another causes the edges of the labels retained on adjacent vacuum label holding heads to become overlapped with one another.

DESCRIPTION OF THE INVENTION

Figure 1:
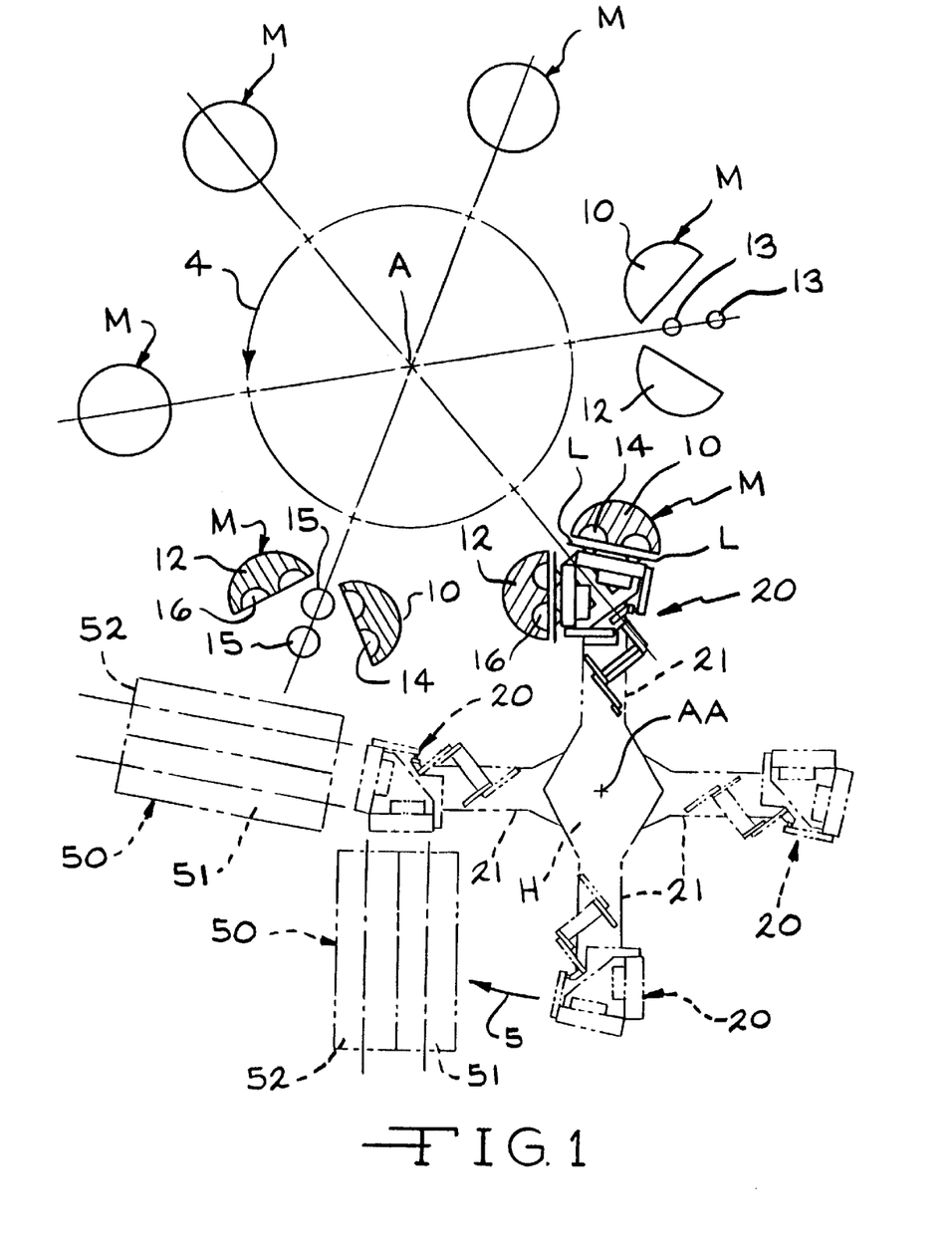
FIG. 1 is a schematic plan view of a rotary blow-molding machine and the in-mold labeling apparatus of the present invention.

Referring to the drawings, there is shown schematically in FIG. 1 a blow molding machine having a plurality of molds M which rotate about an axis A in the direction of the arrow indicated by the numeral 4 throughout a number of positions including (1) a position at which the molds M successively receive lengths of heated plasticized tubing 13 (i.e. parisons) when the sections 10 and 12 of the partible mold are open and (2) a position where, following closing of such mold sections 10, 12 around the lengths of plasticized tubing 13, pressurized air is introduced therein to expand the tubing 13 into conformity with the mold cavities defined by the cooperating recesses 14 and 1 6 of the closed sections 10, 12 of the mold M to form a bottle 15 in each of the cavities. Following expansion of the tubular parisons to form the bottles 15, the mold sections 10, 12 are opened, the bottles 15 are ejected from the mold M. Thereafter, the empty, open mold M arrives at a position at which a label L may be inserted into each of the recesses 14, 14 and 16, 16 of the open mold sections 10, 12. With the labels L positioned in the recesses 14, 14 and 16, 16 and retained in the recesses by vacuum, the mold M is ready to receive the next lengths of heated plasticized tubing or parisons 13 to repeat the cycle. As is well known in the art, the molds M move continuously around the axis A and the positions described above are not fixed but rather lie in an arcuate segment traversed by the molds M as they move about the axis A.

Figure 2:
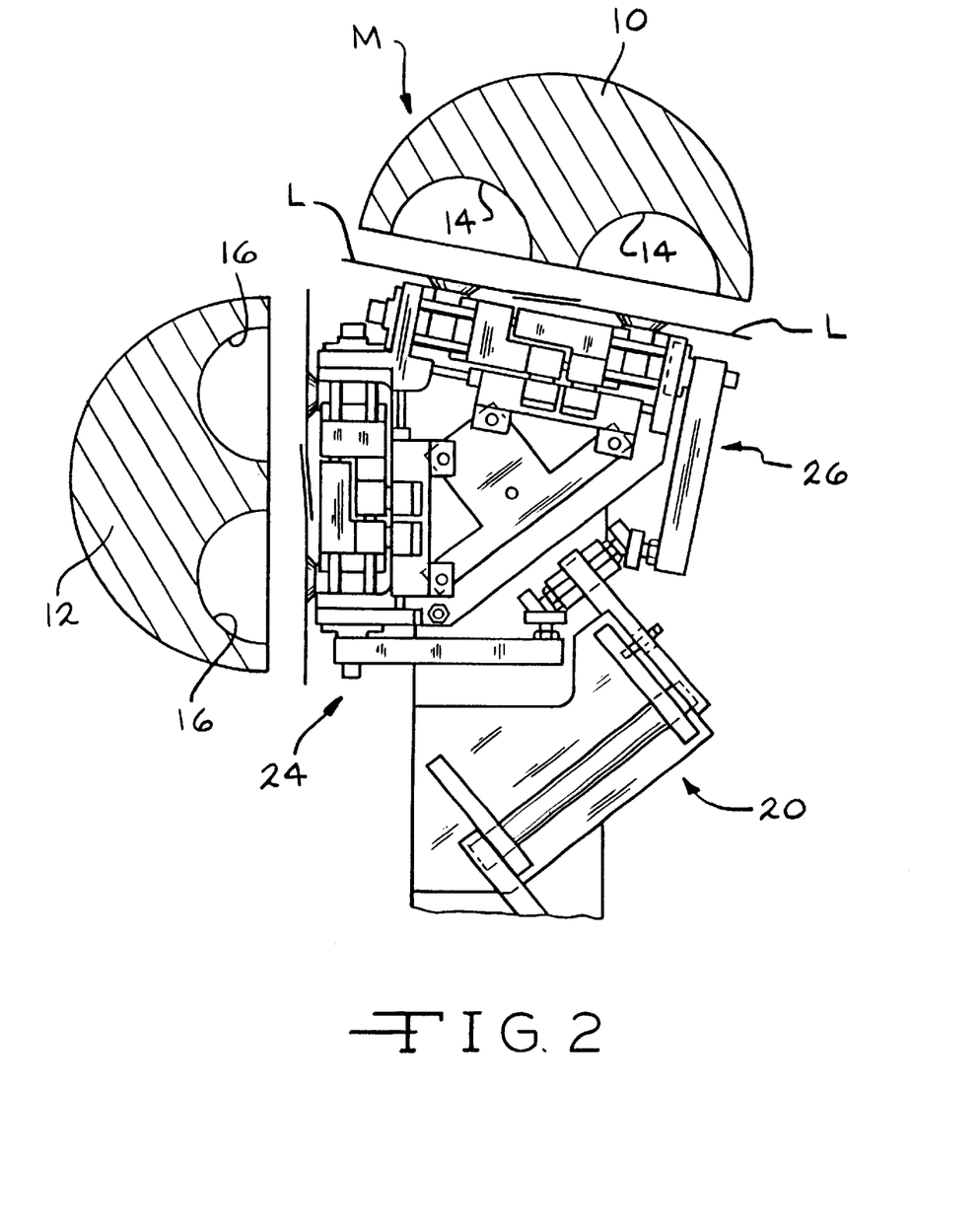
FIG. 2 is an enlarged plan view showing one placer arm assembly of the in-mold labeling apparatus having two sets of vacuum label holding heads about to deliver labels to the recesses of a pair of mold sections.
Figure 3:
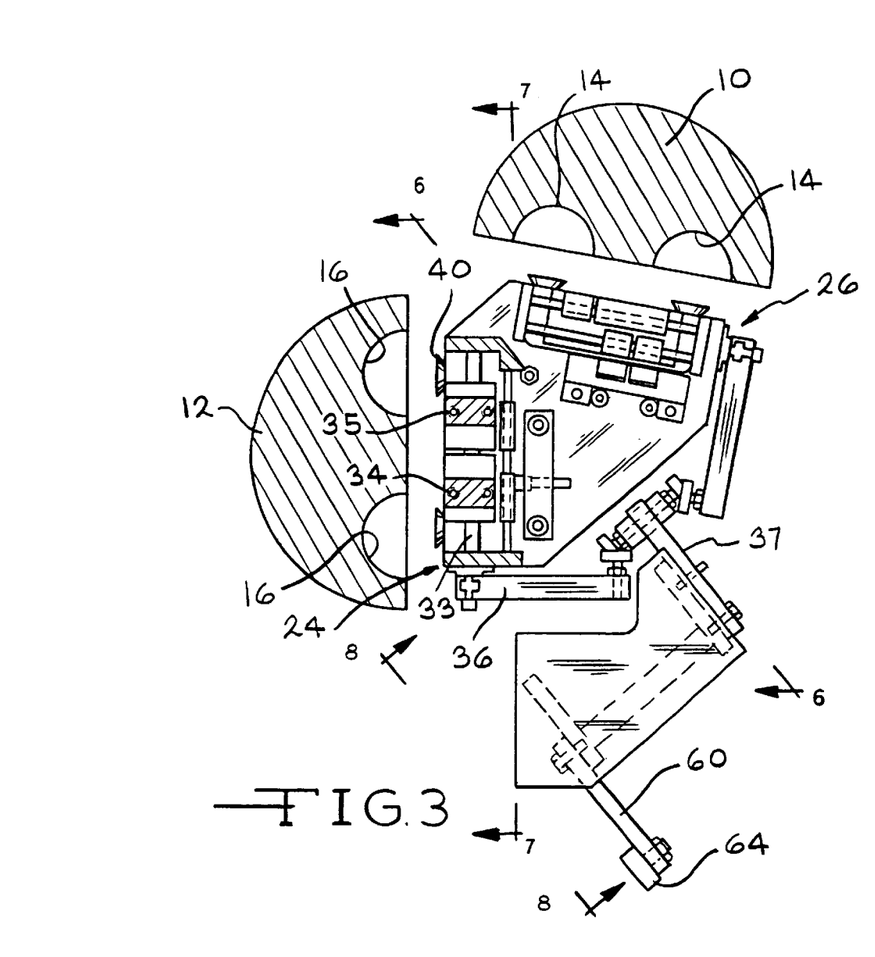
FIG. 3 is a further enlargement of a placer arm assembly showing additional details.

As shown in FIGS. 1 and 2, each of the recesses 14, 14, 16, 16 includes a semi-cylindrical wall portion. When the mold sections 10 and 12 are closed, the cooperating recesses 14 and 16, 14 and 16 each define a cylindrical wall portion such that a bottle 15 formed therein will have a cylindrical wall portion.

Blow-molding machines in which sets of blow-molds rotate about an axis are well known in the art. See for example, U.S. Pat. Nos. 5,104,306 and 5,266,149.

As shown in the drawings, the in-mold labeling unit of the present invention includes four placer arm assemblies 20 mounted for rotation about an axis AA in the direction of the arrow 5 in FIG. 1. Each of the placer arm assemblies 20 is mounted on a support member 21 extending from a hub H. The placer arm assemblies 20 are positioned 90° from each adjacent placer arm assembly 20. Following its alignment with the molds M, each placer arm assembly 20 will be rotated to a position remote from the molds M and aligned with label magazines 50, 50. When so aligned, the placer arm assemblies 20 engage and withdraw a label L from each of the label magazines 50, 50 and transfer such labels to the mold insertion position aligned with the molds at which the labels L may be inserted in the recesses 14, 14, 16, 16 of the respective mold sections 10 and 12.

Each placer arm assembly 20 is supported on the support members 21 includes an actuator bracket 22 and a pair of label transfer units 24 and 26 for inserting labels respectively into the recesses 14 of mold section 10 and the recesses 16 of mold section 12. The principle of operation of each of the label transfer units 24 and 26 is similar. Accordingly, only one such label transfer unit 24 will be further described.

The label transfer unit 24 includes a left placer arm 27 and a right placer arm 28 mounted on a placer arm bracket 29. (See FIG. 6). Also, supported on the placer arm bracket 29 are a pair of spaced apart upper shaft brackets 32 to which are connected an elongated rod 33. The left placer arm 27 has a horizontal drive bracket 34 and the right placer arm 28 has a horizontal drive bracket 35. The rod 33 extends through each of the horizontal drive brackets 34 and 35. A crank arm 36 has one end connected to a bell crank arm 37 and its other end connected to the rod 33 engaged to the respective left horizontal drive bracket 34 and right horizontal drive bracket 35. Each of the drive brackets 34 and 35 carries a roller 38. Each roller 38 rides in a channel 39 of a deployment assembly 31. Actuation of the bell crank arm 37 causes the deployment assembly 31 to be moved from the elevated position shown in FIG. 4 to the lowered position shown in FIG. 5. The drive brackets 34, 35 cause the rollers 38 to rotate in the channels 39 of the deployment assembly 31 thereby causing the left placer arm 27 and the right placer arm 28 to be moved inwardly toward one another so that they are spaced apart closer than when the deployment assembly was in the raised position shown in FIG. 4.

Figure 4:
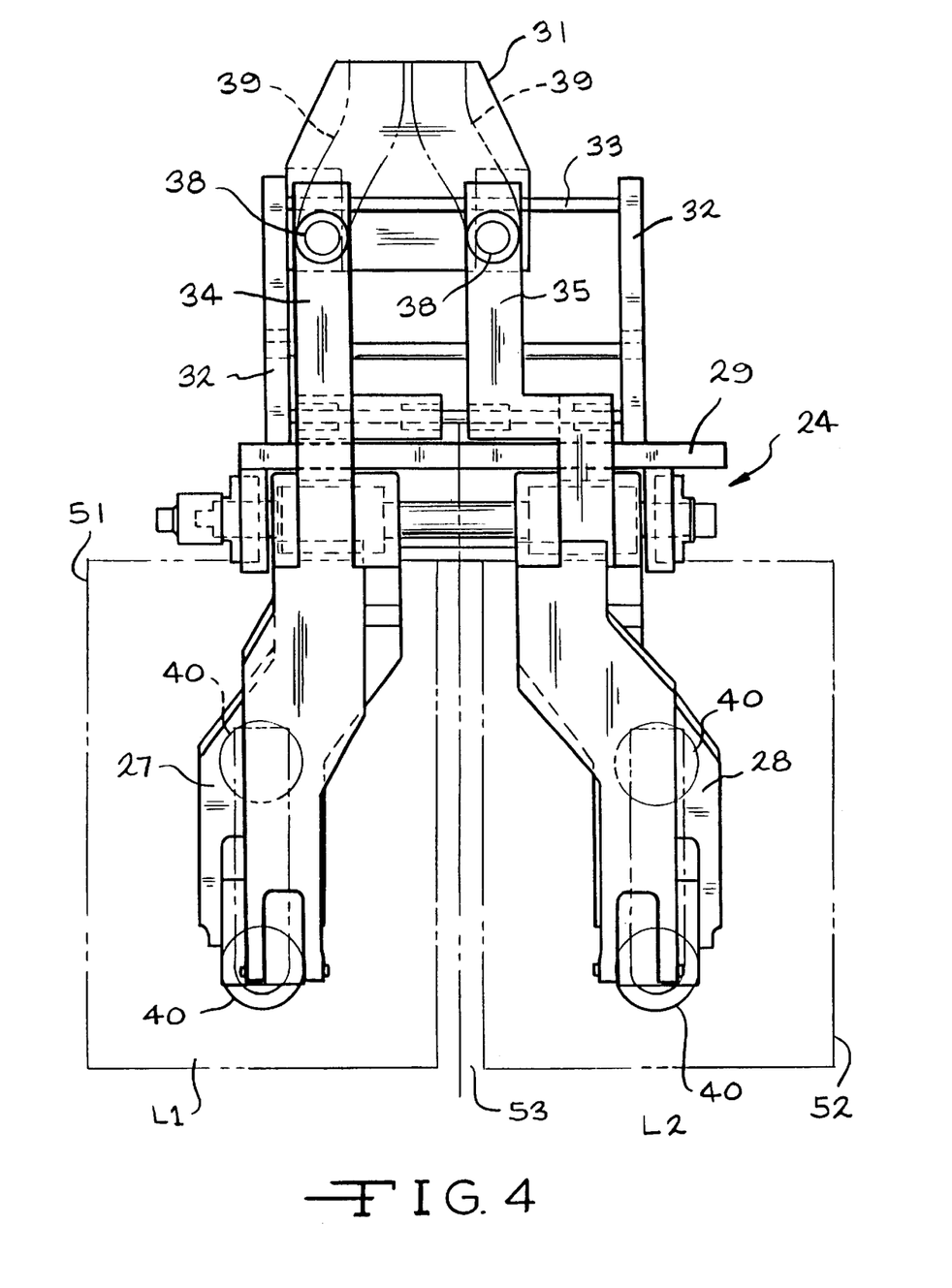
FIG. 4 is an elevational view showing two sets of vacuum label holding heads each of which is positioned to receive a label from adjacent lanes of a label dispensing magazine.

Each label magazine 50 has two lanes of labels to be dispensed, namely, a left lane 51 and a right lane 52. In FIG. 4, the end label of the left lane 51 has been designated L1 and the end label of the right lane has been designated L2.

Each of the left placer arm 27 and right placer arm 28 has a pair of vacuum heads 40 for gripping and withdrawing the end label L1 or L2 from its respective aligned lane 51 or 52. As can be seen in FIG. 4, the left placer arm 27 is positioned such that the vacuum heads 40 supported thereon are positioned substantially at the center line of the labels L1 contained in lane 51 and the right placer arm 28 is positioned such that the vacuum heads 40 supported thereon are positioned substantially on the center line of the labels L2 supported in the right lane 52. As can be seen, there is small space 53 between the left lane 51 and the right lane 52 and, therefore, between the labels L1 and L2.

Figure 5:
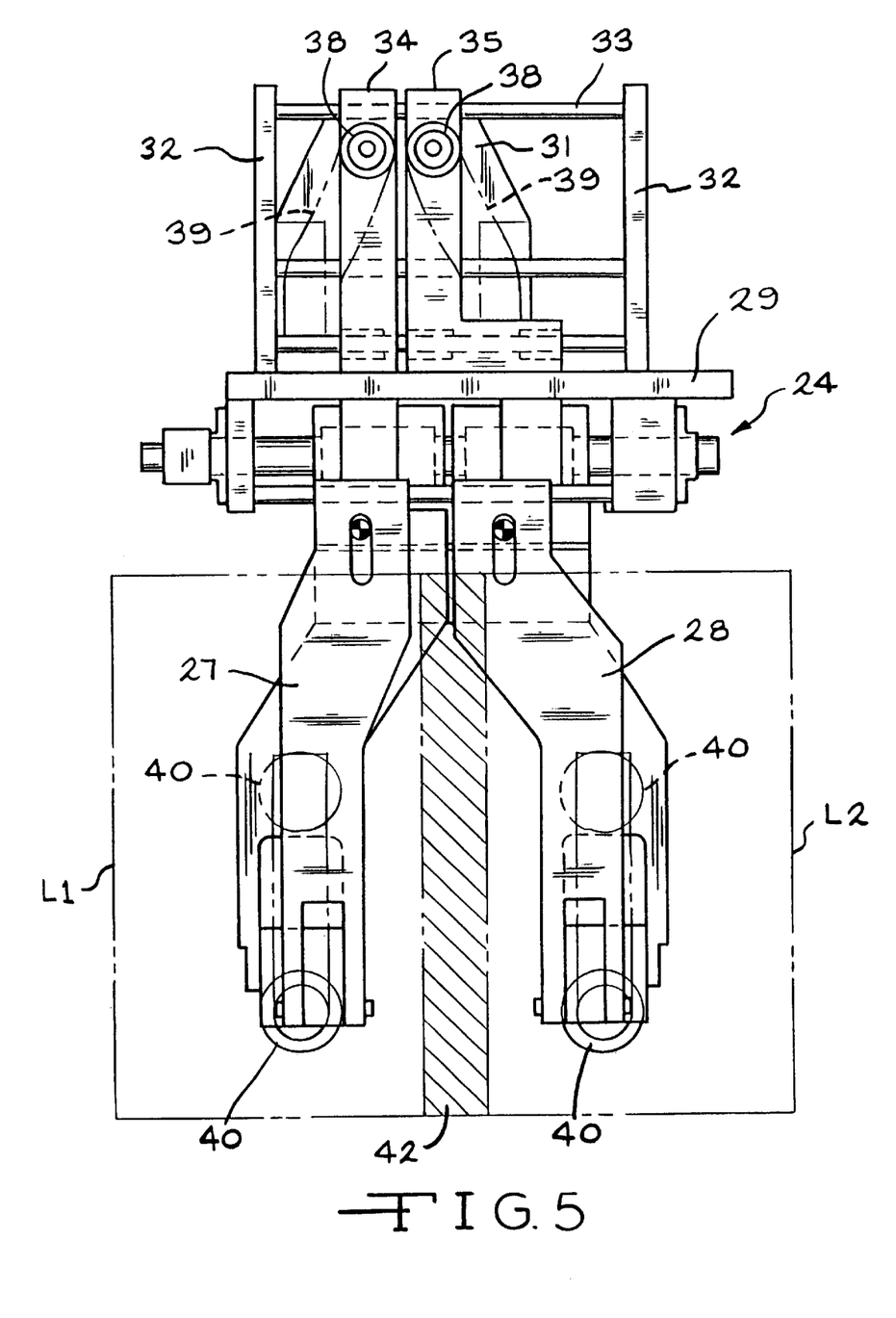
FIG. 5 is a view similar to FIG. 4 showing the sets of vacuum label holding heads positioned closer to one another in order to insert adjacent labels into adjacent ones of mold recesses.
Figure 6:
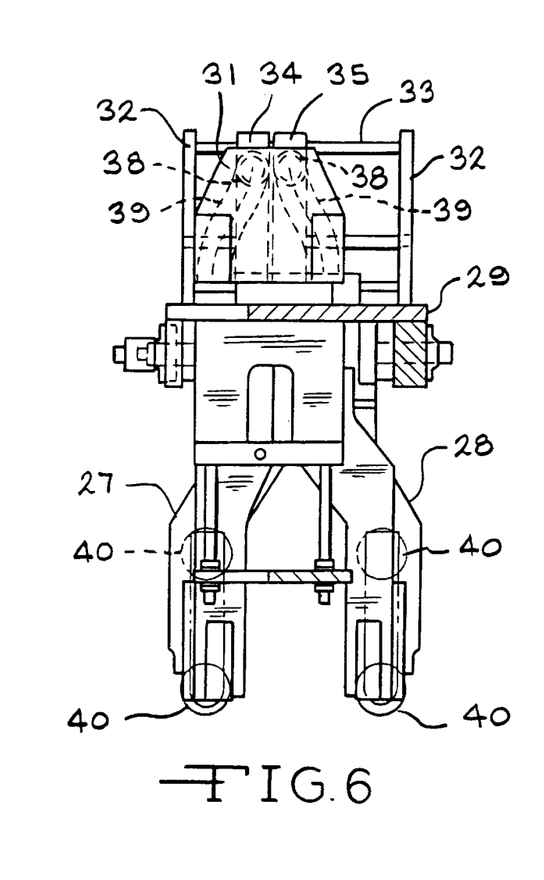
FIG. 6 is a view taken through Section 6—6 of FIG. 3.
Figure 7:
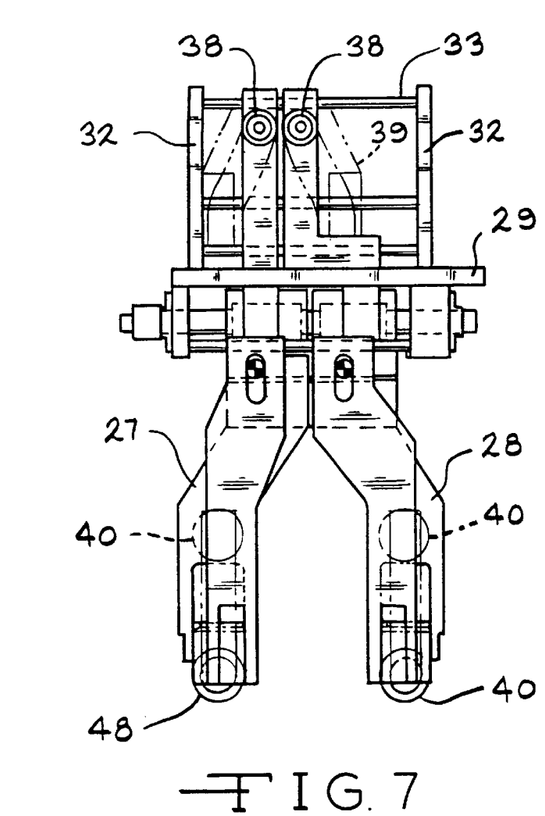
FIG. 7 is a sectional view taken through Section 7—7 of FIG. 3.

As previously discussed, in order to permit the recesses 14, 14 and 16, 16 of the respective mold sections 10 and 12 to be positioned as close together as possible, the center-to-center distance between adjacent recesses 14 and 14, 16 and 16 is less than the circumferential length of such recesses 14, 14 and 16, 16. Accordingly, in order to insert the labels L1 and L2, simultaneously in both recesses 14,14 of the mold section 10 and both recesses 16, 16 of the mold section 12, it is necessary to move the left placer arm 27 and the label L1 carried thereby and the right placer arm 28 and the label L2 carried thereby closer together as shown in FIGS. 2 and 5. This results in the right edge of label L1 carried by the left placer arm 27 to overlap the left edge of label L2 carried by the right placer arm 28. The overlapped area of the labels L1 and L2 is cross-hatched in FIG. 5 and designated by the numeral 42.

Figure 8:
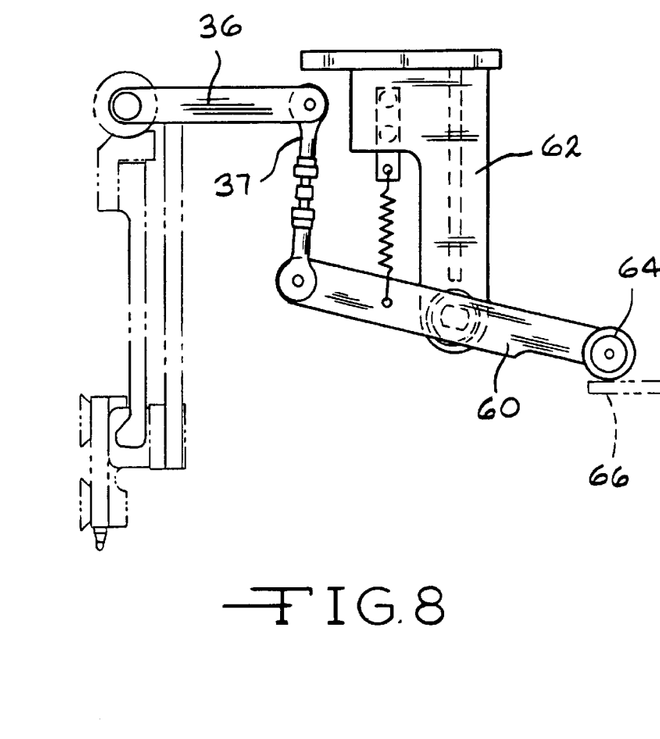
FIG. 8 is a sectional view taken through Section 8—8 of FIG. 3.

FIG. 8 shows a bell crank actuator arm 60 pivotally supported on a support member 62 and having a cam follower 64 at one end for engaging a cam 66. The other end of the bell crank actuator arm 60 is attached through conventional connector members to the bell crank arm 37 which is connected to the crank arm 36.

In operation, as each placer arm assembly 20 rotates with the hub H about its axis AA, the label transfer units 24 and 25 will rotate to a position at which each will be aligned with its respective label magazine 50, at which position the left and right placer arms 27 and 28 are in their maximum spaced apart position shown in FIG. 4 so that their respective vacuum heads 40 will be aligned respectively with the centerline of the labels L1 in the left lane 51 and the centerline of the labels L2 in the right lane 52. When in such position, the left placer arm 27 and right placer arm 28 will be caused to move forwardly toward the end label L1 and L2 of each of the lanes 51 and 52, grip such end labels and move away from the label magazine 50 carrying with them a label L1 on the left placer arm 27 and L2 on the right placer arm 28. As shown in FIG. 4, such labels are in spaced relationship with a space 53 therebetween. At the same time, the other label transfer unit 26 carried on the placer arm assembly 20 grasps labels from its aligned label magazine in a similar fashion.

As the placer arm assembly 20 with labels supported thereon rotates upon rotation of the hub H about its axis AA, toward a position opposing the recesses 14, 14 and 16, 16 of the respective mold sections 10 and 12, the left placer arm 27 and right placer arm 28 are caused to move toward one another as shown in FIGS. 2 and 5 so that the vacuum heads 40 carried thereby are aligned substantially with the centerline of the respective recesses 14, 14 of the mold section 10 and recesses 16, 16 of the mold section 12. The left placer arm 27 and the right placer arm 28 are then caused to move forwardly into the recesses 14, 14 and 16, 16 to deposit the a label L in each of the recesses. Upon engaging the wall of the recesses, vacuum to the vacuum heads 40 is reduced or ceased completely in order to release the labels which are then supported by vacuum in the recesses.

Although the present invention has been described for use with a blow-molding machine in which the molds rotate about an axis and the labeling unit rotates about a separate axis, it will be readily recognized that the broad inventive feature of labeling cylindrical bottles by engaging labels from a pair of lanes of a label magazine and moving the labels toward one another into overlapping relationship by movement of the arms carrying the vacuum heads supporting the labels toward one another prior to inserting the labels into the recesses of the respective mold sections could also be used in a blow-molding machine in which the molds do not rotate and the placer arms, vacuum heads and labels are moved along a planar path as the labels are carried to a position aligned with the mold section recesses.

Other modifications will be apparent to those skilled in the art. Accordingly, the scope of the present invention should be determined only by the scope of the claims appended hereto.

I claim:

1. A method for labeling plastic bottles having a circular cross-sectional configuration in the area to be labeled comprising the steps of:
    (a) providing
        (i) a label magazine having first and second lanes for retaining a plurality of labels, each lane having a substantially flat end label;
        (ii) a label transfer mechanism having first and second label grippers; and
        (iii) a blow mold having sections moveable between an open position and a closed position, each of said sections having a plurality of recesses and adapted to receive therebetween tubular plastic parisons when in the open position and, when closed, defining a plurality cavities;
    (b) providing relative movement of said first and second label grippers toward one another while said labels are retained thereon to cause; labels retained on said first and second label grippers to become overlapped;
    (c) moving said transfer mechanism with a label retained on each of said label grippers between said mold sections to position said labels between said mold sections; and
    (d) inserting labels in each of said recesses.

2. The method according to claim 1 wherein said label grippers engage labels from each of said lanes simultaneously.

3. The method according to claim 1 further including the step of expanding a parison into contact with labels in each of said recesses to mold bottles having labels affixed thereto, said labels from cooperating recesses substantially completely encircling said bottles.

4. A method for positioning a label in each of a plurality of first recesses of a first mold section, said first mold section having a mating second mold section closeable therewith, said second mold section having second recesses each of which cooperates with one of said first recesses when said first and second mold sections are closed to define a cavity having a cylindrical portion, said first recesses being spaced apart from one another with the center-to-center distance between adjacent first recesses being less than one-half the circumference of a cylinder defined by said cylindrical portion, comprising the steps of:
    (a) providing first and second label engaging heads;
    (b) providing a label dispenser for dispensing the end label from each of a pair of lanes;
    (c) engaging the end label of one of said lanes with said first label engaging head and engaging the end label of the other of said lanes with said second label engaging head;

(d) providing relative movement of said first and second label engaging heads toward one another while said labels are retained thereon to cause said retained labels to become overlapped; and (e) inserting labels in each of said first recesses.

5. In combination (a) a machine for blow molding plastic articles, said machine including a blow mold having a plurality of molding cavities, said molding cavities including a cylindrical wall portion, said blow molds defined by mold sections, each mold section having a plurality of recesses which cooperate with recesses of a mating mold section to define said molding cavities when said mold sections are closed, said recesses of a mold section being spaced apart a fixed distance; and (b) a labeling unit for positioning labels in said recesses including (i) a label magazine having a plurality of lanes, each having a centerline and containing a supply of labels including an end label, the distance between the centerlines of adjacent lanes being greater than said fixed distance between said mold section recesses;

(ii) a label transfer assembly for engaging a first end label from one of said lanes and a second end label from the other of said lanes and transferring said first and second end labels to one of said mold sections and inserting said first end label into one of said recesses and said second end label into an adjacent one of said recesses, said label transfer assembly including spaced apart first and second label grippers and means for moving said first and second label grippers with labels affixed thereto closer together.

6. The combination according to claim 5, wherein said label transfer assembly is mounted for rotation about an axis from a label grasping position aligned with said label magazine to a label insertion position for inserting labels in said recesses.

7. The combination according to claim 6, further including an actuator for said means for moving said first and second label grippers closer together, said actuator being operable following engagement of labels by said first and second label grippers and prior to inserting labels in said recesses.

8. The combination according to claim 7, wherein said actuator is operable during rotation of said label transfer assembly.

9. The combination according to claim 5, wherein said first and second label grippers are operable to simultaneously insert said first end label and said second end label in there respective aligned recesses.

10. The combination according to claim 5, wherein said means for moving said first label gripper closer to said second label gripper includes (i) a pair of arms, at least one having a cam roller, and (ii) a deployment assembly movable relative to said arms, said deployment assembly having a cam engaged by said cam roller to effect movement of said first label gripper toward or away from said second label gripper upon movement of said deployment assembly relative to said arms.

11. In combination (a) a machine for molding plastic articles, said machine including a mold having a plurality of molding cavities, said molds defined by mold sections, each mold section having a plurality of recesses which cooperate with recesses of a mating mold section to define said molding cavities when said mold sections are closed, said recesses of a mold section being spaced apart a fixed distance; and (b) a labeling unit for positioning labels in said recesses including (i) a label magazine having a plurality of lanes, each having a centerline and containing a supply of labels including an end label, the distance between the centerlines of adjacent lanes being greater than said fixed distance between said mold section recesses;

(ii) a label transfer assembly for engaging a first end label from one of said lanes and a second end label from the other of said lanes and transferring said first and second end labels to one of said mold sections and inserting said first end label into one of said recesses and said second end label into an adjacent one of said recesses, said label transfer assembly including spaced apart first and second label grippers and means for moving said first and second label grippers with labels affixed thereto closer together.

12. A method for positioning a label in each of a plurality of first recesses of a first mold section, said first mold section having a mating second mold section closeable therewith, said second mold section having second recesses each of which cooperates with one of said first recesses when said first and second mold sections are closed to define a cavity, said first recesses being spaced apart from one another with the center-to-center distance between adjacent first recesses being less than one-half the circumference defined by said cavity, comprising the steps of:

(a) providing first and second label engaging heads;

(b) providing a label dispenser for dispensing the end label from each of a pair of lanes;

(c) engaging the end label of one of said lanes with said first label engaging head and engaging the end label of the other of said lanes with said second label engaging head;

(d) providing relative movement of said first and second label engaging heads toward one another while said labels are retained thereon to cause said retained labels to become overlapped; and (e) inserting labels in each of said first recesses.

* * * * *